Sept. 2, 1924.

W. KABELITZ

SUPPORTING DEVICE FOR FILM SPOOLS

Filed Aug. 30, 1921

1,507,118

Inventor:
Wilhelm Kabelitz
by Leo J Matty
atty.

Patented Sept. 2, 1924.

1,507,118

UNITED STATES PATENT OFFICE.

WILHELM KABELITZ, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

SUPPORTING DEVICE FOR FILM SPOOLS.

Application filed August 30, 1921. Serial No. 496,947.

(GRANTED UNDER THE PROVISIONS OF THE ACT OF MARCH 3, 1921, 41 STAT. L., 1313.)

*To all whom it may concern:*

Be it known that I, WILHELM KABELITZ, a citizen of the German Republic, and resident of Friedenau, near Berlin, Germany, have invented certain new and useful Improvements in and Relating to Supporting Devices for Film Spools, for which I have obtained German Patent No. 307,883, filed Oct. 27, 1916, granted Sept. 14, 1918, and of which the following is a specification.

This invention relates to a supporting device for film spools particularly film spools for photographic cameras and has for its purpose to provide a construction which allows easy removal of the spool from the casing. To this end the supporting device according to this invention is provided with a bearing member for one end of the spool which allows turning about an axis which crosses the axis of the spool, such bearing member consisting of an angularly shaped body, one leg of which forming the support for the spool and the other leg being pivotably connected with a suitable carrier which preferably is a cross wall of the camera casing.

The invention is illustrated in the accompanying drawing in application to a roll-film camera of which only a portion of the casing is illustrated.

Figure 1:
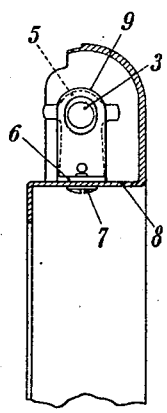
Fig. 1 is an end view of the new bearing construction and of its carrier.
Figure 2:
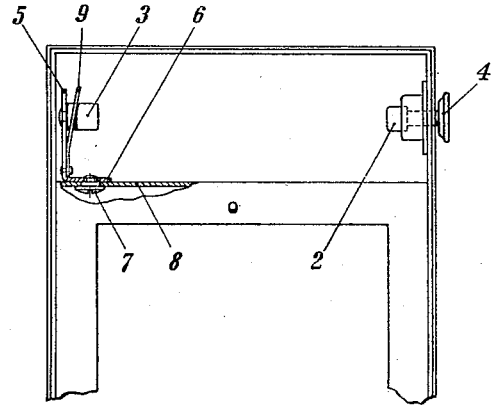
Fig. 2 is a side view of a portion of the camera casing with the new supporting device.

In the figures of the drawing the spool is designated 1; it is provided as usual with end bores adapted to receive supporting pins 2, 3. Pin 2 is made in known manner axially slidable and provided with a knob 4 for manipulation. Pin 3 is provided at the leg 5 of an angle piece the second leg 6 of which is mounted pivotably about pin 7 on a wall member 8 of the camera casing. 9 is a leaf spring fixed to leg 5 of the bearing angle encircling pin 3.

In order to remove a spool inserted in the casing pin 2 is retracted by grasping knob 4, so as to give free that end of the spool mounted on pin 2; thereafter the spool is somewhat tilted causing a slight rotation of the angle piece 5, 6 about pivot 7. In this way the end of the spool coordinated to pin 2 is raised above the wall of the casing so that the spool can easily be removed; spring 9 operates as ejector for the spool.

Figure 3:
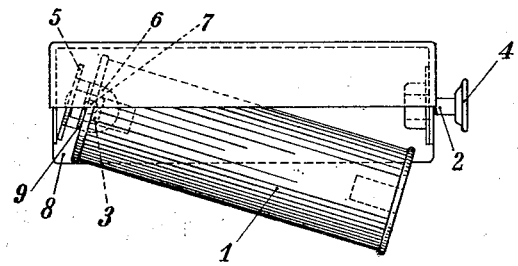
Fig. 3 illustrates the insertion and removal of a spool.

In order to insert a spool the angle piece 5, 6 is brought into the position shown in Fig. 3 and the one end of the spool put on pin 3. Then the spool is pushed into the casing while pin 2 is retracted; this being done the insertion of the spool is finished by bringing pin 2 into engagement with the bore of the spool. Spring 9 secures automatically the correct position of the spool.

What I claim is:

1. Supporting device for film spools comprising an angle shaped bearing member for one end of the spool and an axially shiftable supporting member for the other end of the spool, the angle shaped bearing member being pivotably connected with a suitable carrier by a pivot pin crossing the axis of the spool and adapted to swing about said pivot pin independently from said axially shiftable supporting member for the other spool end.

2. Supporting device for film spools comprising an angle shaped bearing member for one end of the spool, one leg of which forming the support for the spool and the other being pivotably connected with a suitable carrier, the spool supporting leg of the bearing member being provided with a spring adapted to contact with the spool end when inserted in the bearing and to hold it under pressure.

In testimony whereof I have signed this specification in the presence of two subscribing witnesses.

WILHELM KABELITZ.

Witnesses:
EBERHARD FAEHLING,
FRITZ SCHMIDT.